United States Patent [19]

Remeika et al.

[11] 4,001,371

[45] Jan. 4, 1977

[54] CATALYTIC PROCESS

[75] Inventors: Joseph Peter Remeika, Warren; Rudolf Johannes H. Voorhoeve, Summit, both of N.J.

[73] Assignee: Bell Telephone Laboratories, Incorporated, Murray Hill, N.J.

[22] Filed: Mar. 6, 1975

[21] Appl. No.: 555,809

Related U.S. Application Data

[62] Division of Ser. No. 375,948, July 2, 1973, Pat. No. 3,884,837.

[52] U.S. Cl. .............................. 423/213.2; 423/239; 423/245; 423/247
[51] Int. Cl.$^2$ ......................................... B01D 53/34
[58] Field of Search ............ 423/212, 213.2, 213.5, 423/239, 245, 247

[56] References Cited

UNITED STATES PATENTS

| | | | |
|---|---|---|---|
| 3,644,147 | 2/1972 | Young | 136/86 D |
| 3,780,126 | 12/1973 | Manning | 242/471 X |
| 3,884,837 | 5/1975 | Remeika et al. | 423/213.2 X |

*Primary Examiner*—G. O. Peters
*Attorney, Agent, or Firm*—George S. Indig

[57] ABSTRACT

Catalyst members of a class exemplified by $La_{0.8}K_{0.2}MnO_3$ catalyze the conversion of $NO_x$ pollutants to the non-polluting materials $N_2O$, $N_2$, and $O_2$. These compounds are also effective for promoting oxidation reactions such as CO to $CO_2$.

5 Claims, 15 Drawing Figures

CATALYTIC PROCESS

CROSS REFERENCE TO RELATED APPLICATION

This application is a division of my allowed application Ser. No. 375,948 filed on July 2, 1973 now U.S. Pat. No. 3,884,837.

BACKGROUND OF THE INVENTION

1. Field of the Invention

The invention is concerned with catalysts and catalysis. While the invention is of particular interest with respect to conversion of polluting $NO_x$ compounds to non-polluting form, it is concerned also with catalysis of a more general class of reactions including oxidation as well as reduction.

2. Description of the Prior Art

There is rapidly growing concern with the ecological effects of effluents produced by a variety of processes. A source of pollution of particular concern to many is exhaust produced by light vehicles powered by internal combustion engines. Pollutants characteristically contained in such exhaust are classified either as incompletely combusted fuel--e.g., CO and unburned hydrocarbon--or oxidized material ancillary to the combustion process--e.g., oxides of nitrogen sometimes designated $NO_x$.

Growing concern with pollution resulting from automobile exhaust has prompted legislation and a variety of research and development programs in many countries. In the United States, for example, legislation provides for reduced CO, hydrocarbons and $NO_x$ emission in 1973 model year automobiles; further reduced CO and hydrocarbon emission in 1975 model year automobiles; and further decreased $NO_x$ in the 1976 automobile model year.

Several approaches have been taken to minimize content of incompletely combusted emission products. These have included after burners, electronically controllable fuel injection (to optimize air-fuel mixture under all driving conditions) stratified charge, (providing for ignition in an enriched mixture with progression of the burning front into a lean mixture. Ignition is not easily initiated in a mixture sufficiently lean to assure substantially complete combustion), and catalytic converters.

A complete solution to the problem of incompletely combusted emission pollutants is clearly available. Several vehicles, although generally of unconventional engine design, meet the standards. Catalysts also are promising, and substantially complete conversion of CO and hydrocarbons to $CO_2$ and $H_2O$ has been shown to occur under a variety of conditions. At this time, it is likely that a greater development effort is being directed to platinum-containing catalysts than any others despite a variety of problems. These include lead poisoning due to tetraethyl lead, included as an anti-knock agent in gasoline; the high cost of such precious metal-containing catalysts and an apparently limited supply. Other catalysts, however, may be developed to satisfactorily meet this need. These include perovskites of the class exemplified by $(La,Pb)MnO_3$ (177 Science 353 (1972)).

Nitrogen oxides, in the view of many, are not as easily disposed of. This class of pollutants which occurs as a by-product in the operation of high efficiency, high combustion ratio engines has not as easily yielded to catalysis. It has been the general consensus that $NO_x$ is not catalytically decomposed to yield $N_2$ and $O_2$--this would be the ideal solution. The catalytic conversion of $NO_x$ to $N_2$ in the presence of a reducing ingredient, such as CO, has been carried out with some degree of success with metallic catalysts but work to date has generally been of limited promise by reason either of catalyst instability or poor low temperature activity. At lower operating temperatures, catalysts have generally been ineffective, or else where hydrogen is present in the form of $H_2$ or $H_2O$ have resulted in the production of $NH_3$. Ammonia gas is, itself, a pollutant, and further, if passed through a catalytic chamber designed to oxidize CO, generally undergoes reoxidation to NO. Production of $NH_3$ at higher temperatures if it occurs is not so significant, since this compound is quite unstable above about 500° C. Where decomposition does not occur spontaneously, it may be catalyzed by any of a number of $NH_3$ decomposers.

By reason of the above, the general approach to the removal of $NO_x$ has assumed a different direction. In the United States, for example, 1973 model year automobiles are provided with means for recirculation of a fraction of the exhaust gas to the engine. Recirculation of a fraction of about 10 percent of the exhaust results in substantial lowering of $NO_x$ emission. This is due, in part, to the shift in equilibrium resulting from the concentrating of $NO_x$ but, more significantly, to the displacement of oxygen thereby resulting in a cooler burning front in the engine cylinder. Recirculation, while accomplishing its objective--reduction of $NO_x$ emission--has the alarming effect of significantly decreasing engine efficiency. It has been estimated that increased fuel consumption due to exhaust recirculation is at a minimum of 10 percent. It is expected that this expedient will result also in increased maintenance problems, and operational difficulties have already been experienced.

Preliminary investigation of a class of perovskite catalysts has shown significant activity in the catalytic removal of $NO_x$ as well as of CO and unburned hydrocarbons over temperature ranges including those which occur shortly after automobile start-up. The prototype material useful for both types of reactions may be represented by the atom formula $RE_{1-x}M_xMnO_3$ in which RE is La, Pr, or Nd; and M is Pb, Sr, Ca, or Ba. See 177, Science 353 (1972) and 180 Science, 62 (1973). Some enhancement in the activity of such catalysts designed for $NO_x$ removal has resulted from acid etching (180 Science, supra.) and in partial substitution of manganese by Ru and/or Ni. See US Application Ser. No. 364,260 filed May 29, 1973. Catalysts of this class are of both scientific and practical interest in that a significant part of the nitrogen-containing reaction product is $N_2O$. In general, production of this material has been significant over a temperature range of up to about 350° C.

SUMMARY OF THE INVENTION

A class of catalysts chemically related to the manganites described in 180, Science, page 62 (1973) is set forth. The new class may be generally represented by the atom formula $RE_{1-x}M_xMnO_3$; in which, as in the class described in 180 Science 62 (1973) RE is one or more of the elements lanthanum, praseodymium, and neodymium. Enhanced activity as described is due to the nature of the M ion which is a monovalent ion partially replacing RE (dodecahedral site). Examples are sodium, potassium and rubidium. X, representing the atom fraction of the M ion replacing RE, is within the numerical range of from 0.05 to 0.5. This formula sets forth the essential catalyst composition of the invention. It may, of course, be modified or admixed with other material to meet specific needs. For example, it may be blended with prototypical manganites as recited in the Science article cited above or with other catalysts designed to promote the same or different reactions (e.g., to decompose $NH_3$).

Catalysts of the invention are useful for catalyzing a variety of reactions. Much of the data presented under Detailed Description, however, is concerned specifically with catalyzing the reaction of $NO_x$ pollutants (including NO and $NO_2$) to produce non-polluting products. These catalysts have exhibited unusual behavior in their effect on reactions of this nature and this use serves both as a focal point and as a preferred embodiment of the invention.

Working under test conditions designed to simulate or be indicative of activity in the exhaust stream of an internal combustion engine, it is observed that the new catalysts have significant low temperature activity and, that over a temperature range of up to about 525° C, this activity may in part take the form of $N_2O$ production, a non-polluting oxide of nitrogen not easily converted back to polluting form under usually encountered conditions. A further characteristic considered to represent a departure from prior experience is continued catalytic conversion of $NO_x$ in the presence of free oxygen. Since removal of $NO_x$ involves one or more reduction reactions, this evidences catalytic acitivity of considerable magnitude.

Effective conversion of $NO_x$ over a temperature range from that attained shortly after engine start-up and including extremes attained during operation, gives rise to promise of a non-recirculating all-catalytic exhaust system. Such a "straight-through" exhaust system is described and constitutes an embodiment of the invention. Continued activity of these catalysts in the presence of oxygen suggest two forms of exhaust pollution control apparatus not generally considered feasible up to this time.

The first involves use of a single catalytic chamber provided with an air-intake and containing a single catalyst or possibly a blend of catalysts (perhaps including a prototype material as describeed in the Science article) in which both oxidation and reduction processes are catalyzed simultaneously. Such a single chamber system can now be considered for the removal of all three common pollutants associated with automobile emissions--i.e., carbon monoxide, unburned hydrocarbon, and $NO_x$.

The second is concerned with pollution control of diesel emission. Diesel engines, in general, when operating efficiently, emit an oxygen-containing exhaust. The $NO_x$ content of such exhaust, no less serious than that of spark-initiated internal combustion engines has not generally yielded to the catalytic approach.

DETAILED DESCRIPTION

1. The Figures

The first four FIGS. reflect data derived from experiments in which NO-containing gaseous mixtures were passed through a catalytic chamber containing compositions noted. All expermients were conducted under the same conditions. In each instance the amount of catalyst was approximately 1 gram; the catalyst was contained in a tube about 1 square centimeter in cross section and the length of the catalyst charge was approximately 0.3 centimeters. Catalysts were in powder form and those of FIGS. 1 through 3 were produced by firing carbonate and oxides as described under "Processing" herein. Active surface area was measured at approximately 3 square meters per gram, therefore, representing a total of 3 square meters for the gram charge. Flow rate of gas under treatment was approximately 15 liters/hour or for the dimensions noted was at a linear rate of approximately 150 meters/hour.

Meaningful units for evaluating catalyst activity are ml of gas/$m^2$ catalyst surface area in reactor/hour--this derives from the fraction of the volume of gas under treatment divided by the available surface area of the catalyst, with the volume of gas measured at room temperature and computed on an hourly basis. For all of FIGS. 1 through 4, this parameter was numerically equal to 16,000ml/$m^2$h (milliliters/$meter^2$xhour). This is a flow rate reasonably indicative of that to be expected in present day automobile exhaust systems.

The composition of gaseous material under treatment in FIGS. 1 through 7 was 1.3 percent CO, 0.13 percent NO, 0.4 percent $H_2$, remainder He. The composition of the experiment corresponding with FIG. 8 includes water vapor and $CO_2$ and, in consequence, is therefore a closer approximation of actual exhaust gas. Its composition was 1.3 percent CO, 0.13 percent NO, 3 percent $H_2O$, 3 percent $CO_2$, remainder He.

All experiments reported on FIGS. 1 through 11 set forth three primary nitrogen-containing exhaust constituents, NO, $N_2$, and $N_2O$, each expressed as a mole percent of the amount of incoming NO converted to each of the indicated effluent constituents.

Figure 1:
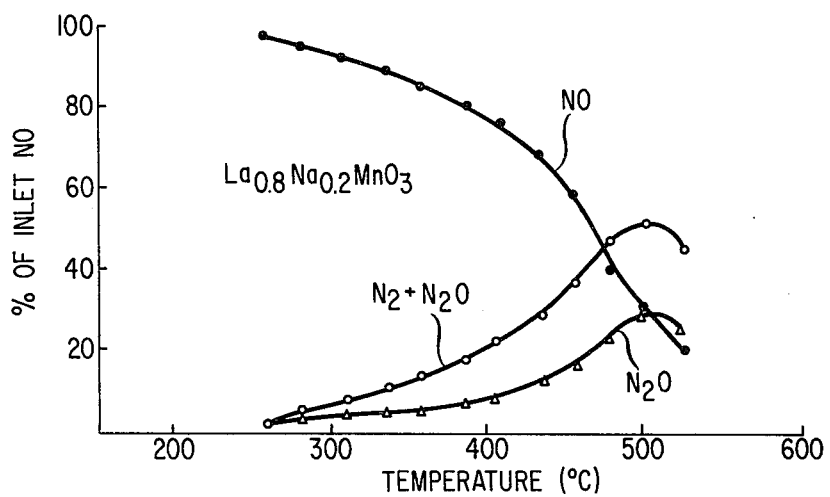
FIGS. 1 through 3, on coordinates of composition of the effluent gas after catalytic treatment as a percentage of converted NO on the ordinate and catalyst temperature in degrees C on the abscissa, is a plot showing three gaseous constituents NO, $N_2O$. and $N_2$ after treatment by illustrative catalysts in accordance with the invention.

Each of FIGS. 1 through 4 includes three curves: the first indicating the content of NO; the second, $N_2O$; and the third, $N_2 + N_2O$. Compositions as noted on these FIGS. are:

FIG. 1: $La_{0.8}Na_{0.2}MnO_3$
FIG. 2: $La_{0.8}K_{0.2}MnO_3$
FIG. 3: $La_{0.8}Rb_{0.2}MnO_3$
FIG. 4: $La_{0.7}Pb_{0.3}MnO_3$.

Data points indicated on the curves are selected measurements, with the remainder of the curve following a significantly larger number of measured data points not specifically indicated. The general effectiveness of the catalysts as affected by the choice of M ion is easily seen. For example, examining the "$N_2O + N_2$" curves, it is seen that percent conversion to the combined $N_2 + N_2O$ in the higher temperature ranges ($T \geqslant 500°$ C) increases in the order of Rb > K > Na. For the total conversion of NO, the three M ions are equivalent. For comparison purposes, FIG. 4—representing a composition as described in 180, Science, page 62 (1973)--$La_{0.7}Pb_{0.3}MnO_3$--is included. It is seen that for NO conversion of $\geqslant 90$ percent a somewhat higher operating temperature is necessary than for any of the compositions of the invention. Perhaps of greater significance is the fact that conversion to the combined $N_2 + N_2O$ in the range of from 300° C to 500° C is significantly improved. This takes the form largely of an increase in $N_2O$ production.

Figure 5:
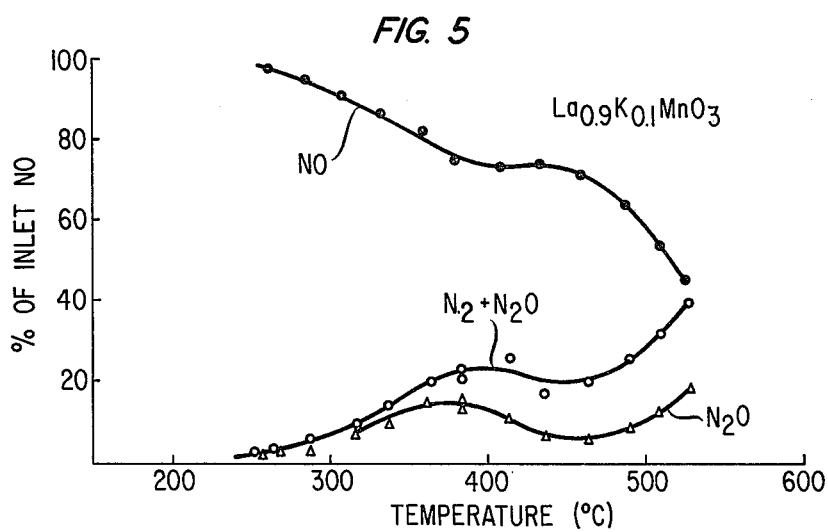
FIGS. 5 through 7 are similar plots for a particular catalyst system--$La_{1-x}K_xMnO_3$--for varying values of x.
Figure 6:
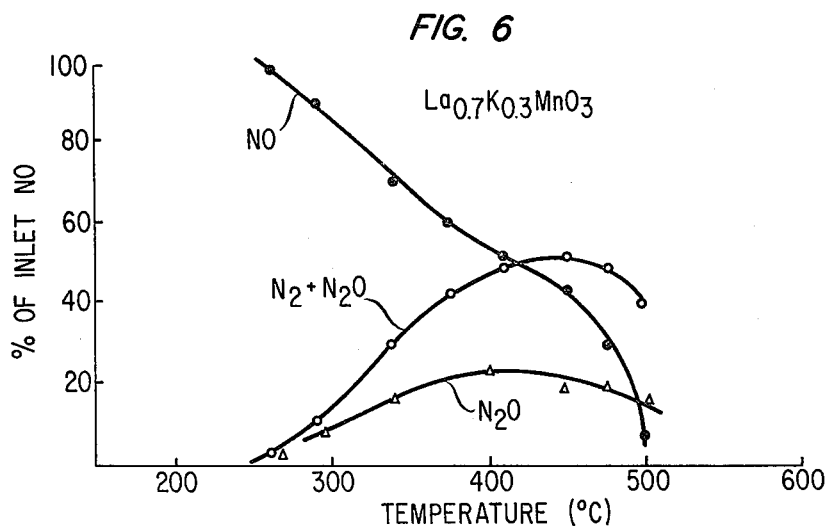
Figure 7:
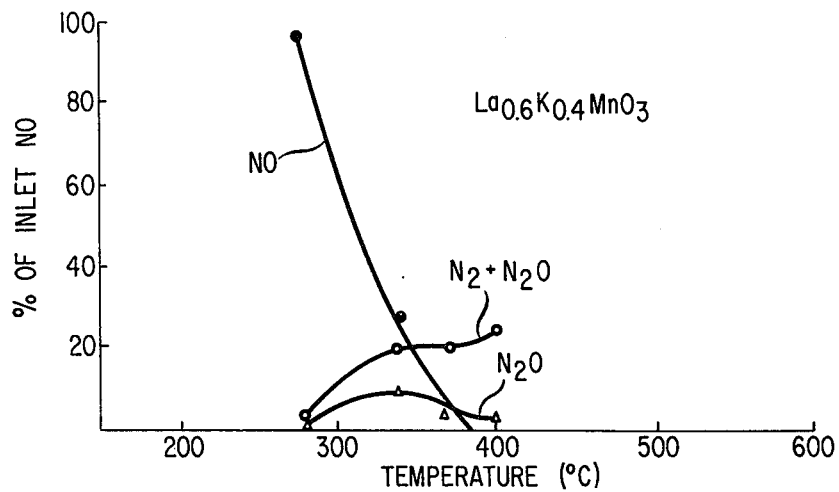

FIGS. 5 through 7 representing test conditions identical to those of the experiments represented by FIG. 1, shows the effect of varying M ion content--in this instance potassium. These FIGS. should be considered with FIG. 2. Compositions are indicated:

FIG. 5: $La_{0.9}K_{0.1}MnO_3$
FIG. 2: $La_{0.8}K_{0.2}MnO_3$
FIG. 6: $La_{0.7}K_{0.3}MnO_3$
FIG. 7: $La_{0.6}K_{0.4}MnO_3$.

It is seen that some drop-off in activity towards the formation of $N_2O + N_2$ is already noted for the extreme compositions--i.e., for $x$ equal to 0.1 and 0.4. All compositions, however, show significant activity in conversion of NO.

Figure 2:
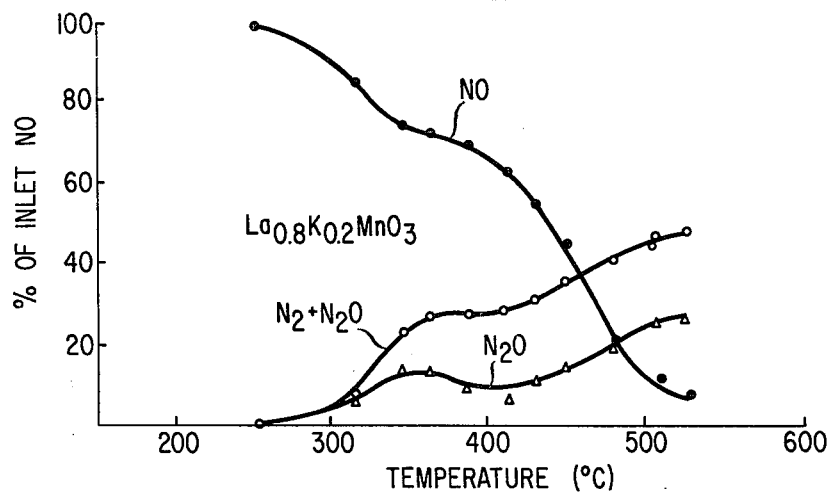
Figure 8:
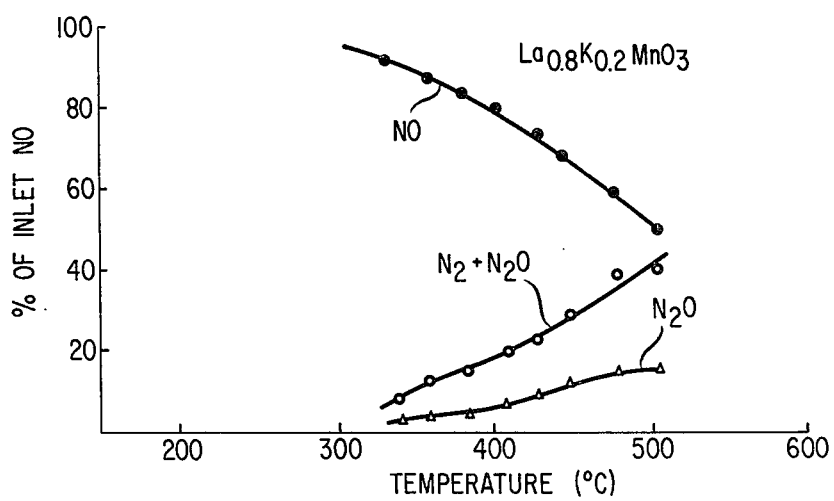
FIG. 8 is a similar plot on the same coordinates showing the same constituents after treatment by the particular catalyst composition of FIG. 2 for a different NO-containing gaseous mixture.

FIG. 8 should be compared with FIG. 2. The catalyst is the same, $La_{0.8}K_{0.2}MnO_3$, but the gaseous mixture contains 3 percent $H_2O$ and 3 percent $CO_2$ in addition to 0.13 percent NO and 1.3 percent CO--remainder He. Water-containing mixtures represent a closer simulation of exhaust environment as encountered in usual internal combustion engine operation. The presence of water-vapor--carbon dioxide mixture--in lieu of pure dry hydrogen tends to impede $NH_3$ production. In terms of the plotted data, this is seen as a decrease in the NO conversion, while at the same time the production of $N_2O + N_2$ is affected much less significantly, especially at the high temperature range, near 500° C. $NH_3$ is, of course, itself a pollutant and is also subject to reoxidation to NO under certain conditions--including those which obtain in a contemplated oxidation catalytic chamber. $NH_3$ formed at higher temperatures---above 350° C--may sometimes be decomposed, e.g., by use of admixture of Ni catalyst.

Figure 9:
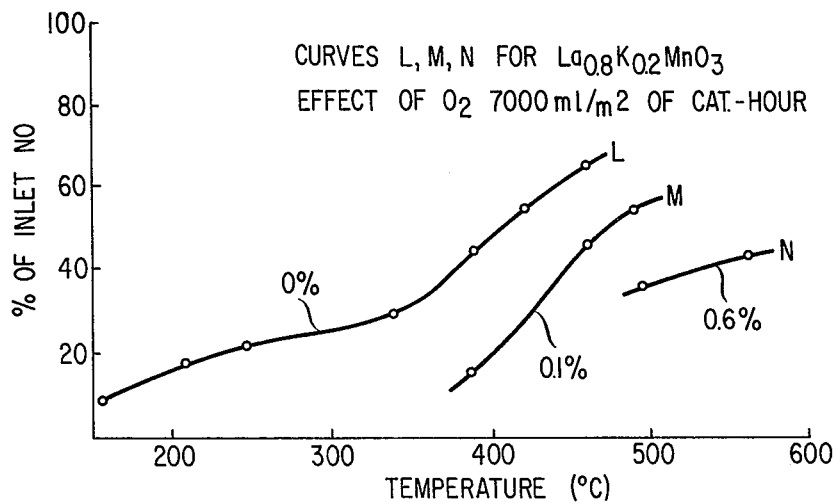
FIGS. 9 through 11 are similar plots with data all utilizing the catalyst composition of FIG. 2, but in which the gaseous composition was varied.

FIG. 9 is illustrative of experimental data showing catalytic activity in an oxygen-containing environment. Coordinate units are the same as in the preceding FIGS. For comparison purposes, the catalyst utilized is, again, $La_{0.8}K_{0.2}MnO_3$. Input gaseous mixture was 1.3 percent CO, 0.13 percent NO, 0.4 percent $H_2$, 0 percent $O_2$, for curve L, 0.13 percent for curve M, and 0.6 percent for curve N, remainder He. Only the conversion of NO to $N_2 + N_2O$ is included. The space velocity was here 7,000 ml/m²cat h (milliliters/square meters of catalyst per hour). While not specifically included, conversion of CO to $CO_2$ for curve N (0.6 percent $O_2$) was at a level of about 90 percent at a temperature of about 495° C and had reached essentially 100 percent yield $CO_2$ at a temperature of about 545° C.

Figure 10:
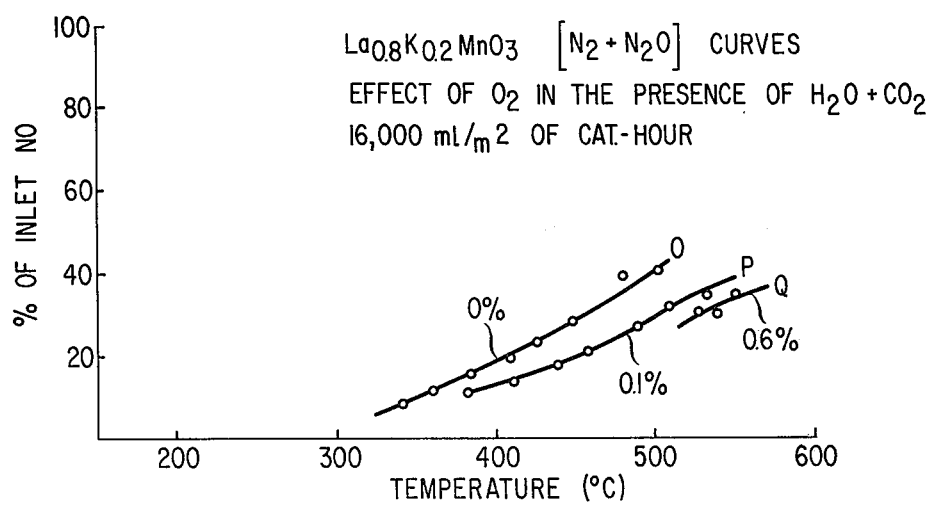

FIG. 10 includes three curves O, P, and Q--and contains data showing the effect of oxygen in a gas mixture already containing a water carbon dioxide mixture. Catalyst ($La_{0.8}K_{0.2}MnO_3$) was the same as in the experiments graphically depicted on FIG. 8. The gaseous mixture aside from oxygen content was also the same as that utilized in FIG. 8--3 percent $H_2O$, 3 percent $CO_2$, 0.13 percent NO, 1.3 percent CO, remainder helium. Each of the three curves on this FIG. shows the total $N_2$ plus $N_2O$ content expressed as a percent conversion of NO in the main in which this data has been reported in the preceding FIGS. As indicated, curves O, P, and Q correspond with experimental runs in which oxygen content is, respectively, 0 percent, 0.1 percent, and 0.6 percent. Curve O should be and is identical to the "$N_2$ plus $N_2O$" curve of FIG. 8. Addition of 0.1 percent oxygen results in some decrease in catalytic activity; and increase of oxygen content to a level of 0.6 percent results in some further decrease. A comparison of FIG. 10 with FIG. 9 reveals that the effect of oxygen in decreasing activity is somewhat diminished in the presence of the water-$CO_2$ mixture. In fact, the comparison is somewhat further improved if space velocities are taken into account. The space velocity in FIG. 10 is more than twice as great as that of FIG. 9. Most significant is the fact that activity in the removal of $NO_x$ in the presence of oxygen continues at a reasonable level. In this connection, Curve Q, corresponding with 0.6 percent oxygen represents a reasonable approximation of the relative oxygen content expected to be encountered in the exhaust from an internal combustion engine.

Figure 11:
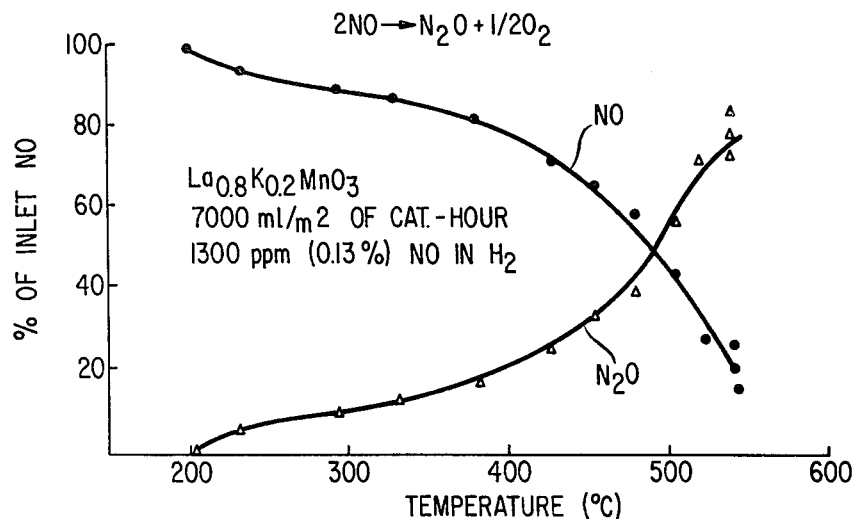

FIG. 11 contains two curves--one for NO and one for $N_2O$ with each, again, representing percent of inlet NO converted. Catalyst is, again, $La_{0.8}K_{0.2}MnO_3$. Space velocity is 7,000 millileters/meter² parameter. The experimental data represented by this FIG., however, represents a significant departure from all other FIGS. in that the entire gas mixture introduced consisted of but 0.13 percent NO, remainder helium. The data plotted, therefore, demonstrates the effectiveness of catalysts of the invention in decomposing NO into $N_2O$ plus $O_2$. With an efficiency of conversion to $N_2O$ approaching the 80 percent level at about 525° C, the effect plotted must be considered surprising in view of prior experience. This data is consistent with the demonstrated continued effectiveness of catalysts of the invention in the presence of oxygen (FIGS. 9 and 10).

Figure 3:
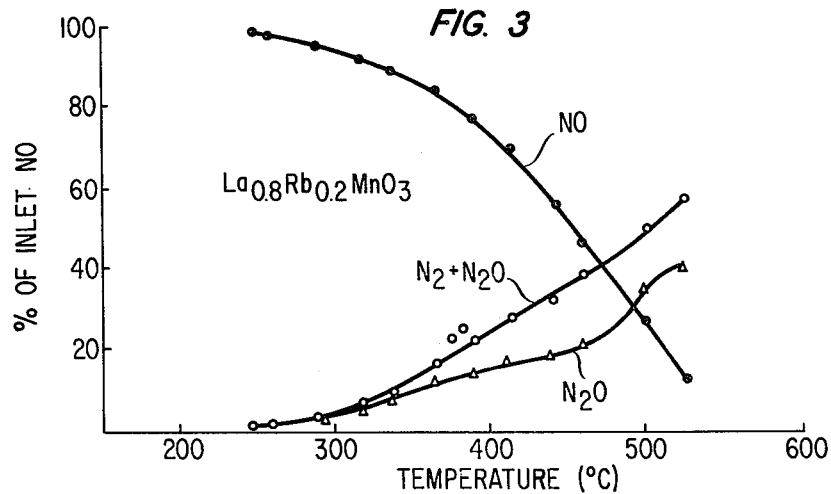

Taking the FIGS. as a whole, FIGS. 1 through 3 demonstrate the similarity of catalytic activity for various of the permitted M ions. For comparison purposes, relative amounts of RE and M are identical for each of the three FIGS. as are all other test conditions.

Figure 4:
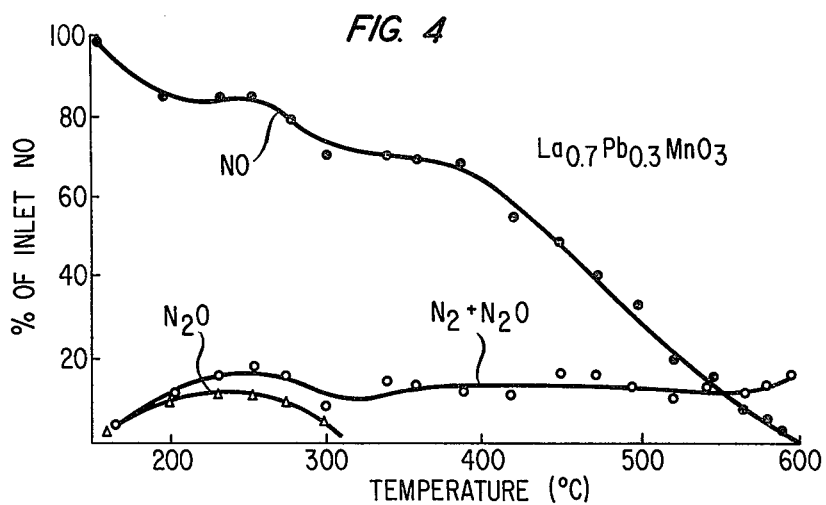
FIG. 4 is a similar plot for the prototype catalyst $La_{0.7}Pb_{0.3}MnO_3$.

FIG. 4 is included for comparison purposes and represents the same set of conditions, however, utilizing a prototypical catalyst as disclosed in 180, Science, page 62, (1973). Most impressive is the continued production of $N_2O$ by the new class of catalysts.

FIGS. 5 through 7 taken together with FIG. 2 show the effect of varying the relative amount of a given M ion. Compositions for which data is plotted are for M ion levels of 0.1, 0.2, 0.3 and 0.4. Optimum activity appears to lie somewhere between 0.2 and 0.3. Clearly, however, the useful range extends beyond the limits noted.

FIG. 8 shows the effect of including an $H_2O$-CO mixture in the inlet gases. As noted, catalyst and other conditions are identical to those of FIG. 2. The immediate effect was to suppress $NH_3$ formation calculable as the difference between the NO curve level and the "$N_2$ plus $N_2O$." $NH_3$ content in the effluent has been determined analytically, also, and such findings completely corroborate the calculated difference amount.

It should be emphasized that the significance of the data plotted in FIGS. 1 through 11 is in the form of the curves and in the trends they represent rather than in the quantitative levels plotted. All catalyst samples were of relatively low surface area as compared with many catalysts in commercial use--active surface areas were approximately 3 square meters/gram; whereas, commercial catalysts frequently have stable free surface areas in excess of 20 square meters/gram. While total reaction rate may not be linearly related to surface area, particularly as total conversion is approached, it is apparent that significant improvement will result from increasing this parameter. Space velocities have, in general, been of a level utilized by commercial developers of exhaust catalysts. Decreasing space velocity is generally equivalent to increasing surface area; and it is, therefore, apparent that a decrease in velocity will also result in increased catalytic activity. Both trends have been experimentally verified with the compositions of the invention. Accordingly, 100 percent conversion or nearly 100 percent conversion of $NO_x$ with but a small content of $NH_3$ in the effluent will result either upon decrease in volume flow rate or upon increase in active catalysts surface area.

Figure 12:
FIG. 12 is a front elevational view of a catalyst in accordance with the invention.

The catalyst shown in FIG. 12 takes the form of a plurality of pellets or particles which may be of uniform composition or may take a supported form with active ingredient being dispersed through or present as a coating on the individual bodies.

Figure 13:
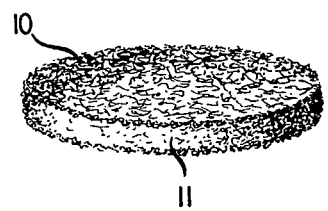
FIG. 13 is a perspective view of a supported catalyst in accordance with the invention.

The physical form depicted in FIG. 13, considered particularly promising for use in a moving stream of gaseous matter, may take the form of the coating 10 of any of the compositions herein on a substrate 11 which may be alumina commonly utilized as a catalyst support in industry. Coating 10 may also be regarded as a layer over which the prototypical composition has been modified by partial substitution of ruthenium and/or nickel for example, by solid-solid or liquid-solid diffusion.

Figure 14:
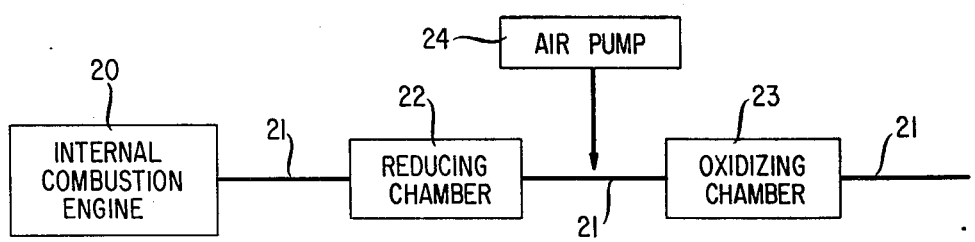
FIG. 14 is a schematic view of an internal combustion engine provided with a straight-through automobile exhaust including two catalytic chambers, the first designed for nitrogen oxide conversion and containing a catalyst in accordance with the invention.

The apparatus of FIG. 14 is a straight-through (non-recycling) exhaust apparatus shown in conjunction with an internal combustion engine. The apparatus depicted consists of engine 20 and exhaust line 21 with sections of line 21 constituting inlets and outlets for reducing chamber 22 and oxidizing chamber 23. Provision is also made for introduction of oxygen via air pump 24 at a position intermediate reducing chamber 22 and oxidizing chamber 23. Each of chambers 22 and 23 contains a bed of catalyst material with that in chamber 22 necessarily being a composition in accordance with the invention. Catalyst contained in chamber 23 may also be a catalyst in accordance with the invention may be a prototypical, that is, unmodified composition containing neither ruthenium nor nickel nor any other subtituent element, or may be of a composition unrelated to that of the invention. The bed may take any of the forms discussed, for example, the fluid bed of Fig. 12 or the fixed bed of FIG. 13.

Particular operating conditions may result in specific engineering variations within the contemplated design. Desire to maintain either chamber within a particular temperature range may be met by proper positioning (e.g., length of exhaust pipe between engine and first chamber) by baffling, by flow of heat transfer medium (e.g., forced air flow about the first chamber or exhaust gas about the second chamber prior to introduction into the first chamber). Use may be made of other catalysts designed to dissociate $NH_3$ or to reduce $NO_x$ at high temperature, either in admixture or other combination with catalysts of the invention, etc.

Figure 15:
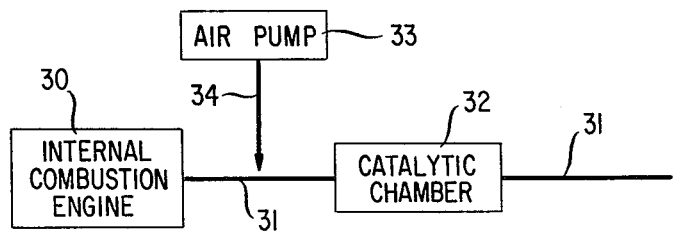
FIG. 15 is a schematic view of an internal combustion engine provided with a straight-through exhaust but including but a single catalytic chamber containing a catalyst of the invention designed for catalyzing both NO and incompletely combusted products.

FIG. 15 depicts a straight-through (non-recycling) exhaust apparent shown in conjunction with an internal combustion engine. The apparatus depicted consists of engine 30, an exhaust line 31, with a section of line 31 representing successive portions of the exhaust system--e.g., manifold, an exhaust pipe, and finally a tailpipe. Catalytic chamber 32 containing the catalyst in accordance with the invention is designed to accomplish removal of both $NO_x$ and incompletely combusted emission products to the subsequent end. There is provision made for introduction of oxygen containing ambient by means of air pump 33 and inlet 34.

2. COMPOSITION

It has been indicated that the active ingredient of the invention may be represented by the atom formula $RE_{1-x}M_xMnO_3$. In this formula RE is at least one of the rare earth elements La, Pr, and Nd. These RE elements constitute an exclusive group of elements which form the perovskite-like materials of the invention. While the three are essentially equivalent other lanthanides may not be substituted. Use of other numbers of the series does not result in a permissible $Mn^{4-}$ which is essential to the invention. M is one or more elements which occupy dodecahedral sites as partial replacement of RE as monovalent ions. Examples are Na, K, and Rb. Cs is not precluded but its size complicates preparation at least where it is the sole M ion and where x is large. The amount of M, expressed as x in the formula is from 0.05 to 0.5 (a preferred range is from 0.1 to 0.4). It is well known that perovskites or perovskite-like materials of this general compositional type are sometimes characterized by vacancies. It is accordingly specified that the composition may be such that the amount of any cation may be reduced by up to 15 atom percent relative to the nominal atom formula to accommodate such vacancies. Prototypical compounds described in 180, Science, page 62 (1973) may include lead, calcium, strontium, or barium as M and partial substitution by any of these elements, for example, up to 50 percent of the total value of x is permitted. In general, however, particularly where catalysis takes the form of conversion of $NO_x$, such partial substitutions are not suggested. Such substitutions may be useful where the intended catalysis includes conversion of partially combusted reaction products. Physical mixtures are more likely to be useful. Admixed material may be included for its activity in promoting particular reactions, e.g., $NH_3$ decomposition.

Copending application, Ser. No. 364,260 filed May 29, 1973 described modifications of the prototype materials of which ruthenium and/or nickel are partially substituted for manganese (i.e., in an octahedral rather than dodecahedral site). (Permitted ruthenium substitution as well as nickel substitution is up to 0.15, either or both elements replacing manganese and both quantities being expressed in terms of the formula unit as set forth.) Ruthenium and nickel substitutions have been found effective in promoting reduction reactions involving NO. Since such substitutions are selective, nickel being particularly useful for promoting low temperature $N_2O$ and $N_2$ production and ruthenium being particularly effective in promoting high temperature $N_2$ production, one or the other or both such substitutions may usefully be made in addition to those set forth. exists for the heavier atoms of the permitted M ions in accordance with describes invention. This preference is based on experimental results and reflects a consideration only of catalytic activity. From a cost standpoint, sodium or potassium and rubidium are preferred in that order although rubidium is a fairly plentiful element.

It has already been indicated that a preference

Components in which lithium is utilized as the M ion have also been prepared and tested. However, such components have not shown the enhanced characteristics of the inventive compositions. While not forming a necessary part of this disclosure, it is interesting to note that the size of the lithium ion is such that it was expected to enter a octahedral site (the site populated by manganese). This was, in fact, verified by X-ray analysis. On the other hand, ions of atoms from potassium on up were expected to and did, in fact, enter dodecahedral sites (sites occupied by RE). Sodium, it was believed, had the capability of entering either site, but X-ray analysis indicates that most or all of this element also enters dodecahedrally. The effect of substitution of any M ion in accordance with the invention, since all such ions are monovalent, is to change the manganese state from $Mn^{3+}$ to $Mn^{4+}$ with perhaps two manganese valence shifts for each M ion. Continued production of $N_2O$ at relatively high temperatures, characteristic of the inventive catalysts, suggests a gas-to-catalyst bonding which is electronic rather than due to van der Waals forces. A preliminary mechanistic explanation would take into account the relative mobility of electrons as between Mn ions where compensation is not nearest neighbor but rather is between different crystallographic sites.

Catalytic activity for certain selected types of reactions may sometimes be enhanced by introduction of other ions. Such ions would include those of Ti, V, Cr, Fe, Co, and Cu. Where the characteristics upon which $NO_x$ conversion is based are to be retained, it is not expected that introduction of any such elements should exceed 0.1 per formula unit. These elements generally enter the compound in the trivalent state (although the possibility of $Co^{2-}$ under proper preparatory conditions is not precluded) and generally occupy octahedral sites.

With regard to x values, both lower and upper limits derive from diminishing catalyst activity. Exceeding the upper limit in x significantly may also interfere with creation of an orderly perovskite-like material.

The original Science article cited above includes chromium as well as manganese. Such compounds are of an activity approaching or equal to that of the manganese for oxidative reactions involving CO or hydrocarbon. They have not generally shown the high activity of the manganese for reduction reactions involving NO. Nevertheless, it is possible that some tailored catalyst package may involve partial substitution of chromite for manganite. This and other substitutions not specified may be made to meet specific needs; but since they do not enhance the NO reactions upon which a preferred embodiment of the invention is based are not considered as being a part of the "essential" active catalyst composition.

It is known that some catalysts notably elemental cobalt or nickel catalyze the decomposition of ammonia. See G. C. Bond "Catalysis by Metals," Academic Press, London (1962) page 381. Under certain circumstances, it may be desirable to include either or both of such elements together with a catalyst of the invention. It is generally contemplated that such inclusion would take the form of an admixture.

The fact that catalysts are frequently used in supported form so that their bulk compositions are effectively diluted by inert ingredients suggests that the compositional definition is to be considered as directed only to the active catalyst ingredient. Any additional substitution in the active catalyst must, as a first requirement, be compatible with the perovskite-like structure which characterizes all catalysts of the invention. It has also been observed that vacancy structures commonly occur within the compositional ranges set forth. Such vacancies which have been observed to within a maximum of about 15 percent for any given cation site suggest a deviation from the formula set forth in which any indicated cation may be reduced accordingly. Workers skilled in the art will recognize the importance of avoiding impurities known to have an undesired effect on the reactions of concern. For example, particularly for low temperature operation, it is desirable to keep coper ion impurity to a minimum, since this element has the effect of catalyzing the formation of $NH_3$. A maximum level on elemental copper inclusion is, therefore, set at about 0.1 weight percent for catalyst of the invention designed for operation on $NO_x$-containing gases. With regard to RE ions, there is at least an economic advantage for lanthanum. This element is now and for the foreseeable future the least expensive of the three permitted rare earth cations. Experiments conducted on manganite catalysts of the perovskite-like structure, however, have indicated no significant variations in activity in the reactions involving $NO_x$.

An advantage of the compositions of the invention is relatively low cost. It is accordingly quite feasible to utilize catalyst bodies of homogeneous composition containing or made up of compositions within the formulation set forth. In the interest of further cost saving and also to improve heat dissipation, it may however be desirable to utilize a supported structure of the type familiar in industry. A common support material is aluminum oxide, $Al_2O_3$. This, as well as other inert materials which may be prepared in high free surface form, may be coated with any of the included compositions.

3. PROCESSING

Materials of the invention are conveniently prepared by ceramic forming procedures. Materials utilized in the experiments graphically represented in the figures were prepared by first weighing the starting ingredients-- e.g., $La_2O_3$, $K_2CO_3$, $Mn_2O_3$---stoichiometric amounts were utilized and atomic absorption analysis has indicated substantial retention of all introduced ingredients. Weighed materials were then ball milled in ethyl alcohol contained in a polyethylene jar for a period of 16 hours. The resultant slurry was then vacuum filtered and air dried. Contents were then introduced into a platinum crucible which was heated to a temperature generally within the range of 900° to 1100° C in air for a period of 15 hours. Resultant material was found to be single phase as determined by X-ray powder diffraction utilizing long exposure--eight hours--on conventional equipment. (This long exposure is sufficient to reveal lines corresponding with compounds or elements other than the intended perovskite-like compound.)

The above procedure is most easily adapted to the preparation of sodium, potassium, or rubidium-containing materials. Preparation of cesium containing materials is complicated by ion size. Preparation of any of the included materials is expedited by preparatory techniques resulting in a very fine particle division, as, for example, by coprecipitation, freeze drying, flame drying, etc.

4. PHYSICAL FORM

Catalysts of the invention in common with those generally utilized for promoting fluid reaction are surface active. Accordingly, particularly where the catalyst composition is homogeneous and consists primarily or exclusively of active ingredients in accordance with the invention, it is desired that the free surface area be maximized. This may be accomplished by ball milling or other grinding procedure or by preparation of porous bodies as by freeze drying, or indeed by any of the techniques set forth under processing above. Such homogeneous compositions desirably manifest a free surface/weight ratio of the order of at least ½ square meter/gram and preferably at least 1 square meter/gram. Measurement of this parameter is conveniently made by standard nitrogen or krypton absorption (*Journal of the American Chemical Society*, Vol. 60, page 309 (1938)), Supported forms of catalysts in accordance with the invention may not manifest such surface/weight ratios of active ingredient although an attempt is made to maximize available free surface, for example, by use of porous or particulate substrates.

5. REACTIONS

Concern thus far has largely been with promoting the reaction of harmful ingredients in the effluent contained, for example, in exhaust gas produced by internal combustion engines. At this time, it would appear that the inventive advance is most significant in this context and particularly where gas treatment contains any of the toxic nitrogen oxide compounds (designated $NO_x$). Contemplated usage is broader still and catalysts of the invention may serve in promoting other reduction or oxidation reaction, for example, the reaction of ethylene with oxygen to form ethylene oxide, a common polymeric precursor.

What is claimed is:

1. In a catalytic process for the removal from a gas flow of at least one material from the group, carbon monoxide, hydrocarbons and nitrogen oxides of the formula $NO_x$, at elevated temperatures, the improvement comprising contacting said gas flow with a catalyst containing an active ingredient consisting essentially of a perovskite-like manganite of at least one rare earth element selected from the group consisting of La, Pr, and Nd in which the said rare earth element is partially replaced, in that the said manganite is of a composition represented by the atom formula $RE_{1-x}M_xMnO_3$ in which RE is at least one element selected from the group consisting of La, Pr, and Nd; M is at least one element selected from the group consisting of Na, K, and Rb in which x is from 0.1 to 0.4 and in which the amount of any of the indicated cations may be reduced by up to about 15 atoms percent to accommodate vacancy structures.

2. The process of claim 1 in which the gas flow includes at least one oxide of nitrogen and in which said oxide of nitrogen is converted to a product selected from the group consisting of $N_2$ and $N_2O$.

3. The process of claim 1 wherein the gas flow includes oxygen.

4. The process of claim 1 wherein the gas flow includes CO and sufficient free oxygen to oxidize the said CO.

5. The process of claim 4 wherein oxygen is added to the gas flow before contact with said catalyst.

* * * * *

UNITED STATES PATENT AND TRADEMARK OFFICE
CERTIFICATE OF CORRECTION

PATENT NO. : 4,001,371
DATED : January 4, 1977
INVENTOR(S) : Joseph P. Remeika and Rudolf J. H. Voorhoeve It is certified that error appears in the above-identified patent and that said Letters Patent are hereby corrected as shown below:

Column 4, line 33, "expermients" should read --experiments--.
Column 6, line 46, "millileters" should read --milliliters--.
Column 7, line 39, "catalysts" should read --catalyst--.
Column 8, line 2, "subtituent" should read --substituent--.
Column 8, line 5, "Fig. 12" should read --FIG. 12--.
Column 8, line 19, "apparent" should be --apparatus--.
Column 8, line 34, "$RE_1^-{}_xM_xMnO_3$" should read --$RE_{1-x}M_xMnO_3$--.
Column 8, line 40, "$Mn^{4-}$" should read --$Mn^{4+}$--.
Column 8, line 68, "described" should read --describes--.
Column 9, line 14, after "forth." insert --It has already been indicated that a preference--.
Column 9, line 16, "describes" should read --the--.
Column 9, line 21, delete the entire line.
Column 9, line 56, "$Co^{2-}$" should read --$Co^{2+}$--.
Column 12, line 8, after "gas" insert --under--.

Signed and Sealed this ninth Day of August 1977

[SEAL]

Attest:

RUTH C. MASON
Attesting Officer

C. MARSHALL DANN
Commissioner of Patents and Trademarks